(12) United States Patent
Wolfe et al.

(10) Patent No.: US 8,152,061 B2
(45) Date of Patent: *Apr. 10, 2012

(54) SYSTEM AND METHOD FOR PROCESSING CLOSED LOOP CARDS AND CODES

(75) Inventors: Jason Wolfe, Sewickley, PA (US); Mark Romanelli, Bridgeville, PA (US); Sanjay Akut, Pittsburgh, PA (US); Mike Kelly, Langhorne, PA (US); Mary Jane Kelly, Langhorne, PA (US)

(73) Assignee: Giftcards.com, LLC, Pittsburgh, PA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/702,600

(22) Filed: Feb. 9, 2010

(65) Prior Publication Data

US 2010/0200654 A1 Aug. 12, 2010

Related U.S. Application Data

(63) Continuation-in-part of application No. 12/573,042, filed on Oct. 2, 2009.

(60) Provisional application No. 61/207,125, filed on Feb. 9, 2009, provisional application No. 61/211,394, filed on Mar. 28, 2009.

(51) Int. Cl.
*G06K 7/01* (2006.01)
(52) U.S. Cl. ............... 235/382.5; 235/380; 235/381; 705/35; 705/39; 705/44; 705/14.26; 705/1.1; 705/16; 705/14.34; 705/14.15
(58) Field of Classification Search ........... 235/380, 235/381, 382.5; 705/35, 39, 44, 14.26, 1.1, 705/16, 14.34, 14.15
See application file for complete search history.

(56) References Cited

U.S. PATENT DOCUMENTS

| | | | | |
|---|---|---|---|---|
| 2005/0228717 | A1* | 10/2005 | Gusler et al. | 705/14 |
| 2006/0037835 | A1* | 2/2006 | Doran et al. | 194/302 |
| 2007/0075134 | A1* | 4/2007 | Perlow et al. | 235/380 |
| 2008/0294518 | A1* | 11/2008 | Weiss et al. | 705/14 |

OTHER PUBLICATIONS

"What is SwapAGift.com?" retrieved from http://www.swapagift.com/ on Oct. 25, 2011.
Swapagift.com Expands its "Cash for Your Card" program, Retrieved from http://www.prweb.com/releases/2003/12/prweb96305.htm on Nov. 9, 2011.
Swapathing, Inc. Announces the Internet's First Online Gift Card Exchange, Retrieved from http://www.prweb.com/releases/2003/10/prweb83758.htm on Nov. 9, 2011.
Cash for your card now! Retrieved from www.swapagift.com on Nov. 9, 2011.

\* cited by examiner

*Primary Examiner* — Kristy A Haupt (57) ABSTRACT

Disclosed herein are systems, methods, and computer-readable storage media for processing closed loop cards/codes. The method includes identifying a closed loop card/code having associated money in an account, receiving a confirmation of an amount of money in the closed loop card/code account, presenting an owner of the closed loop card/code with the amount of money in the closed loop card/code account and an offer to pay an offer amount for the closed loop card/code, receiving an indication that the owner accepts the offer, receiving the amount of money from the closed loop card/code account, and paying the owner the offer amount. Payment can be on an open loop card/code, cash, automated clearing house (ACH) to bank, check, merchant credit, or bill pay. The method can include generating a new closed loop card/code associated with the amount of money. The new closed loop card/code can be sold to another user.

22 Claims, 4 Drawing Sheets

SYSTEM AND METHOD FOR PROCESSING CLOSED LOOP CARDS AND CODES

PRIORITY CLAIM

The present application is a continuation-in-part of U.S. application Ser. No. 12/573,042, filed Oct. 2, 2009, which claims priority to Provisional Application 61/207,125, filed Feb. 9, 2009, and Provisional Application 61/211,394, filed Mar. 28, 2009, all of which are herein incorporated by reference.

RELATED APPLICATIONS

This Application is related to U.S. application Ser. Nos. 12/702,610, 12/702,623 and 12/701,711, filed the same day as this Application.

BACKGROUND

1. Technical Field

The present disclosure relates to processing closed loop gift cards and more specifically to converting or transferring funds on closed loop gift cards and gift codes to open loop gift cards, gift codes, and/or cash.

2. Introduction

Gift cards and gift codes are widely used as gifts for birthdays, Christmas, and other holidays. Gift cards and gift codes are closed loop, meaning that the value represented by a gift card or gift code is a valid form of payment at a closed set of retailers. For example, an Outback Steakhouse® gift card/code is only redeemable at Outback Steakhouse® and not at Planet Hollywood® or Target®. Some closed loop cards and codes are valid at a family of closely related or commonly owned merchants. For example, a Darden Restaurants gift card/code is valid at Red Lobster® and Olive Garden®, or a local mall gift card/code is valid at tenant merchants in the local mall. Open loop gift cards (and gift codes), in contrast, are a valid form of payment at virtually every retailer nationwide, such as Visa® or Mastercard® debit cards.

While gift cards/codes are a popular alternative to giving cash or a merchandise item which the recipient may not like, the recipient may not be able to redeem the gift card/code due to geographic limitations, personal disinterest in the merchant who issued the gift card/code, or other reasons. Additionally, some merchants issue gift cards/codes with significant restrictions, complex fees, and/or an expiration date. According to one estimate, consumers purchase about $80 billion worth of gift cards annually in the U.S. and roughly 10%, or $8 billion, of that amount goes unredeemed. Consumers waste these unredeemed funds and do not benefit from the full value of the gift card/code. Further, if these funds are not spent, they can escheat to the state.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for processing closed loop cards/codes. The method controls a computing device to perform certain steps. The method causes the computing device to identify a closed loop card/code having associated money in a closed loop card/code account, receive a confirmation of an amount of money in the closed loop card/code account, and present an owner of the closed loop card/code with the amount of money in the closed loop card/code account and an offer to pay an offer amount for the closed loop card/code. The method causes the computing device to receive an indication that the owner accepts the offer, receive the amount of money from the closed loop card/code account, and provide payment to the owner of the offer amount. The owner may also reject the offer and counter with another offer.

Some variations and more detailed embodiments of this central concept are outlined below. The payment can be provided as value added to an open loop card/code. The method can cause the computing device to generate a new closed loop card/code associated with the amount of money. In one embodiment, the method causes the computing device to offer for sale the new closed loop card/code at a second offer amount, and, upon a second user accepting the second offer for sale and upon receiving payment, generate and transfer the new closed loop card/code to the second user. The new closed loop card/code can be personalized based on input from the user. In another embodiment, the method divides a large closed loop card/code by causing the computing device to receive a set of smaller values totaling a sum equal to or lesser than the amount of money in the closed loop card/code account, divide the amount of money in the closed loop account into gift cards/codes in denominations of the set of smaller values, and provide the gift cards/codes to the owner as payment. This is called "chopping up" a card/code. In yet another embodiment, the computing device receives an additional amount of money from the owner, and provides payment to the owner by providing a gift card/code to the owner of the offer amount plus the additional amount of money. This is called "topping up" a card/code. In another aspect, the system can take small balances from multiple closed loop cards and combine them into one larger gift card or code.

Receiving a confirmation of an amount of money in the closed loop card/code account can include interacting with a multi-process secure gateway which communicates with one or more closed loop card/code processors. The offer to pay the offer amount can be time-limited and conditioned upon a resale of the closed loop card/code. In this variation, the computing device provides payment to the owner of the offer amount only after the resale. If the closed loop card/code does not resell, the method can cause the computing device to deactivate the closed loop card/code after the owner accepts the offer, and reactivate the closed loop card/code after the time-limited offer expires without resale.

In one aspect, the offer amount is based on a resale velocity of cards/codes of a similar type as the closed loop card/code. The computing device can restrict the amount of money the owner of the closed loop card/code can redeem over a period of time. In a related variation, the computing device can check that the owner is not engaged in fraud with the closed loop card/code and gather personal information such as a driver's license number or credit card/code number. The information identifying the closed loop card/code can be read from a physical closed loop card/code. In this case, the method can control the computing device to receive the physical closed loop card/code, such as at a recycling receptacle.

Throughout this disclosure, closed loop cards and other cards are interchangeable with a closed loop code or other code which serves the same purpose as a physical closed loop card.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
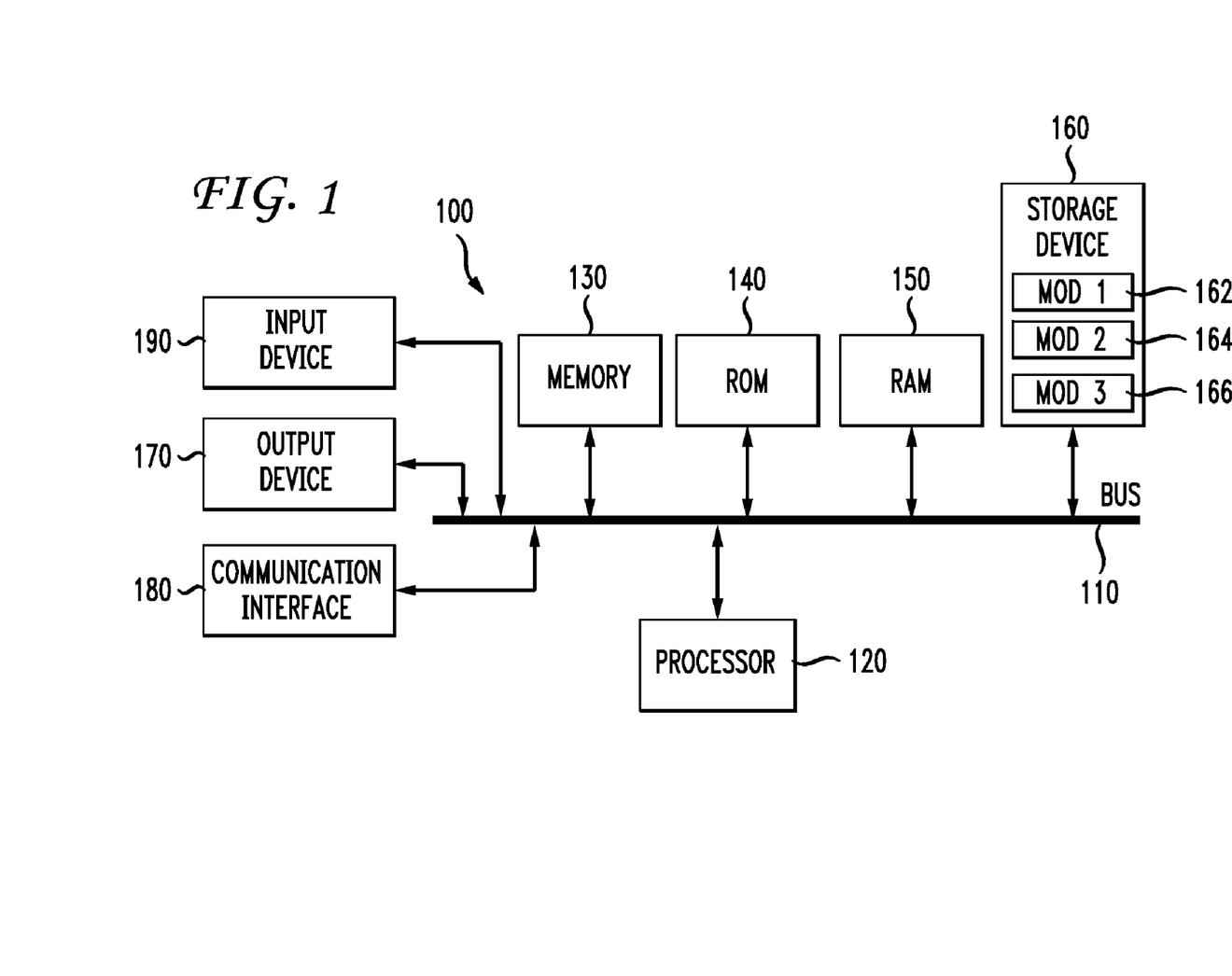
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Gift cards/codes are divided into open loop and closed loop cards/codes. Typically issuing banks or credit card companies issue open loop cards/codes (example: Visa, MasterCard, Amex or Discover) which can be redeemed by virtually any business entity. These differ from closed loop cards/codes which are typically issued by a specific store or restaurant and can be only redeemed by the issuing provider (example: Sears, Red Lobster, Target). Gift cards/codes are one common form of closed loop cards/codes. The physical card/code and the card/code number associated with the card/code are interchangeable concepts. Gift cards/codes can store a reference to the amount of money within a physical card/code or can store a reference to an external database of accounts which references an amount of money. One or more external database can maintain funds from which each of a set of accounts linked to a card/code can draw.

Figure 2:
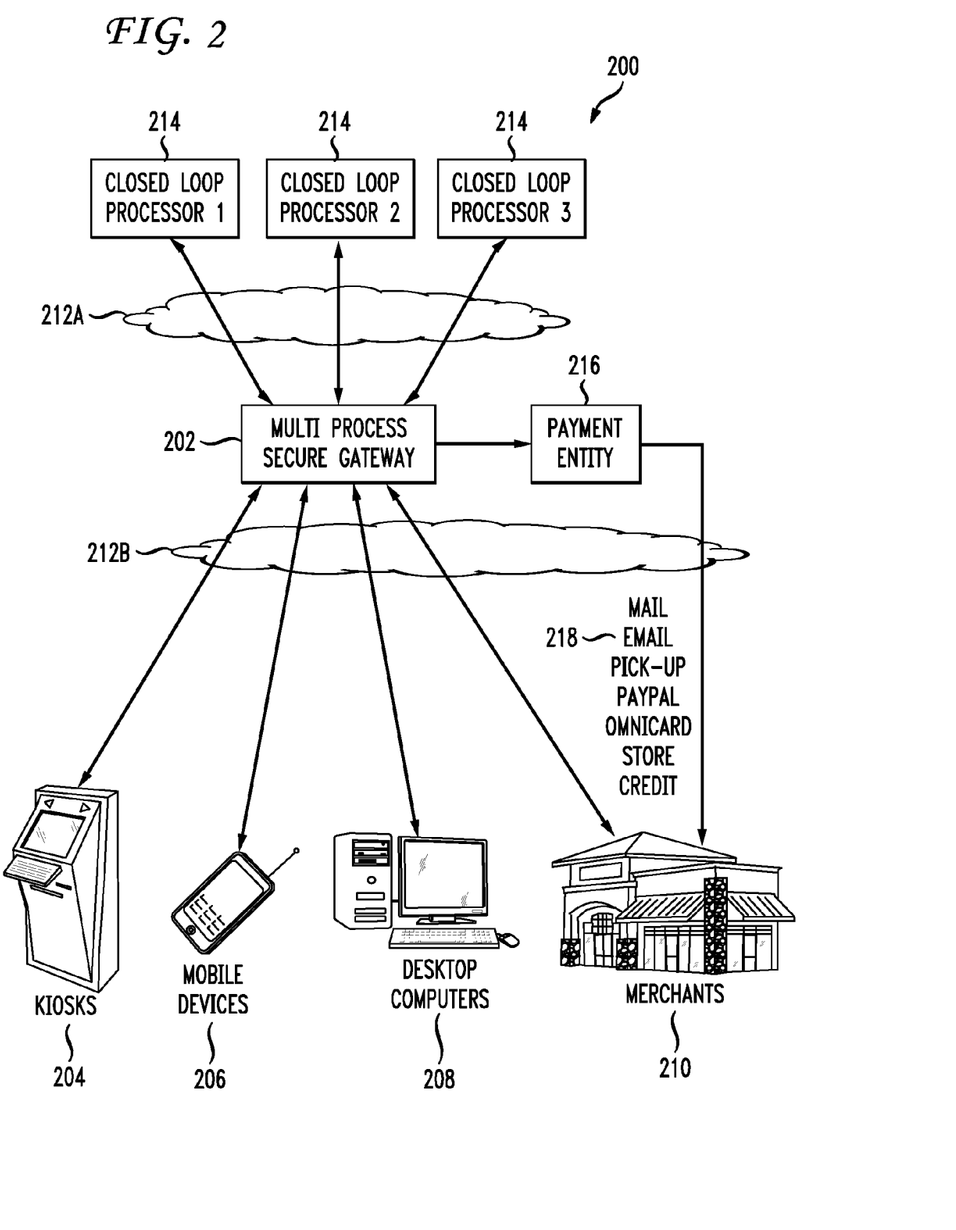
FIG. 2 illustrates a multi-process secure gateway configuration.

Having disclosed some basic system components and concepts, the disclosure now turns to the exemplary method embodiment shown in FIG. 2. For the sake of clarity, the method is discussed in terms of an exemplary system such as is shown in FIG. 1 configured to practice the method.

FIG. 2 illustrates a multi-process secure gateway configuration 200. The multi-process secure gateway 202 can be implemented as a local or remote server, a group of tightly or loosely interconnected servers, integrated as a software module within a point of sale device, or as any other suitable device, software, or combination thereof. In FIG. 2, the multi-process secure gateway 202 is shown as a single conceptual server available over a network 212B such as the public telephone network or the Internet. The multi-process secure gateway 202 interacts with various requesters, such as kiosks 204, mobile devices 206, desktop computers 208, and merchants' point of sale devices 210, which submit information uniquely identifying closed loop cards/codes. Mobile device 206 also represents a standard telephone as well as communication with an interactive voice response system. Each of these devices can interact with the secure gateway 202 through different protocols, such as a direct network connection, an HTTP-based portal, SMS messages, telephone, interactive voice response systems, point-of-sale (POS) terminals, etc. In the case of merchants, each point of sale of the merchant 210 can connect to a centralized merchant server, not shown, which relays requests to the secure gateway 202 on behalf of all the merchant 210 point of sale devices. Other configurations also exist. In one aspect, this process may be called "Cash4Card" (name used for description purposes only). Merchants 210, kiosks 204, other devices and/or locations, including online storefronts, which provide an interface to the secure gateway 202 can provide an easily recognizable visual or other indication readily indicating to potential customers that they accept gift cards/codes under the Cash4Card program. The indication can be a window sticker, an online image, or other sign displayed in a manner similar to the well-known overlapping circles for MasterCard® or the blue and orange bars over and under the word VISA®.

The secure gateway 202 interacts with multiple closed loop processors 214, such as FirstData and Chase Paymentech, over a network 212A such as the Internet. These closed loop processors are entities that process closed loop cards, such as FirstData, and are different from a computer processor such as an AMD Phenom II or Intel Core Duo. The secure gateway 202 can perform any action on the closed loop card/code through the various closed loop card/code processors 214 as if the secure gateway 202 was a closed loop merchant. The secure gateway 202 analyzes the submitted information to determine which closed loop processor handles that type of closed loop card/code. For example, a particular series of numbers or letters can indicate that one closed loop card/code is honored by Paymentech, and another distinct set of numbers or letters indicates that another closed loop card/code is honored by FirstData. The logic and analysis in the secure gateway 202 can change from time to time as new types of cards/codes are issued by existing closed loop processors 214 or as the secure gateway 202 adds interfaces for new closed loop processors. The secure gateway 202 can include a common application programmer interface (API) which defines actions which may be performed through the closed loop processors 214. The API translates API calls to the corresponding specific sets of proprietary interactions with the various closed loop processors 214, which may be very different between closed loop processors 214.

The secure gateway 202 determines the balance of the closed loop card/code from the closed loop processor 214 and offers to purchase the closed loop card/code from the requestor, typically at a price lower than the face value of the card/code (though not always and can be at or above the face value). If the requestor provides an indication of agreement to sell the closed loop card/code, then the secure gateway deactivates the closed loop card/code associated with the submitted information, issues a new closed loop card/code in that amount (which may be a physical closed loop card/code or a virtual closed loop card/code), and pays the purchase price to the requestor through a payment entity 216. The gateway 202 can also provide instructions to other entities to perform the deactivation, issuance, payment, and other steps. The payment entity 216 can be part of the secure gateway 202, part of a merchant point of sale equipment 210, or a separate entity altogether. The secure gateway 202 can provide additional instructions regarding how to transfer payment 218 to the requestor. Some examples of how to transfer payment include mailing a physical open loop card/code to the requestor, emailing to the requestor the necessary information to use a non-physical open loop card/code (such as an account number and PIN), notifying a local financial service to prepare an amount of money for pickup (such as MoneyGram or Western Union), transferring funds to an electronic account (such as PayPal), transferring money to a requestor's existing open loop card/code (such as an OmniCard or other debit card/code), or granting store credit to the requestor. The payment entity 216 can also provide payment to the requestor using other suitable approaches.

Figure 3:
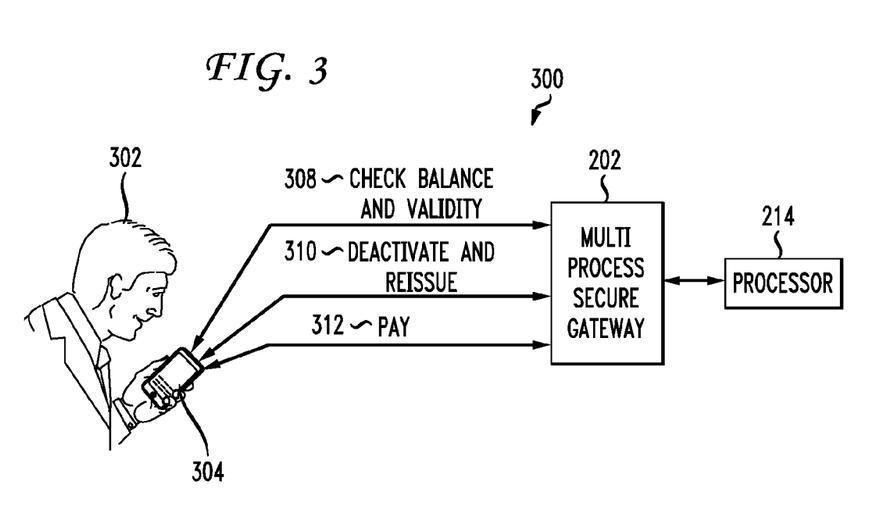
FIG. 3 illustrates a user interaction with a secure gateway.

FIG. 3 illustrates a user interaction with the secure gateway 202 as shown in FIG. 2. The user 302, through a network-enabled device 304, transmits a request to the multi-process secure gateway 202 to check the balance and validity of an identified closed loop card/code 308. The secure gateway 202 communicates with the appropriate closed loop processor 214 and returns the balance to the secure gateway 202. The secure gateway 202 makes a purchase price determination based on resales metrics of that particular type of card/code. Resales metrics can include how fast inventory of a particular type of closed loop card/code is resold, how much inventory is currently held, desired profit margins, operating expenses, fees to transfer or create new closed loop cards/codes, etc. The secure gateway 202 offers to purchase the closed loop card/code from the user 302 for the determined purchase price. If the user accepts, the secure gateway deactivates the closed loop card/code and issues a new closed loop card/code in the same amount 310. The new closed loop card/code can be a virtual closed loop card/code, i.e. numbers stored in a computer-readable storage medium, or an actual printed closed loop card/code. The secure gateway then pays 312 or causes a payment to be made to the user the purchase price as discussed above.

Next, the secure gateway 202 transfers the new closed loop card/code to a reseller. The reseller can offer to sell the new closed loop card/code for less than its face value. For example, if the user 302 submits a $200 Sears gift card/code, the secure gateway 202 can determine that Sears gift cards/codes in that denomination are in high demand and offer to purchase the $200 Sears gift card/code for $135. The user accepts the offer and the secure gateway 202 pays the user $135. The secure gateway 202 deactivates the $200 Sears gift card/code and reissues a new $200 Sears gift card/code which can be represented as numbers stored by the reseller. The reseller then offers the $200 Sears gift card/code for sale to the general public at a discount rate of $170, a 15% discount off the face value. When a customer purchases the $200 Sears gift card/code, the reseller can convert or transfer funds on the virtual gift card/code to a printed gift card/code on demand and mail it to the customer. In this case, the reseller earns the difference between the purchase price $135 and the discount rate $170, or $35. The reseller can operate as a brick and mortar retail store, an online storefront, an online auction, or any other suitable sales outlet. In another aspect, the reseller purchases a gift card/code from a user at or above its face value, i.e. purchases a $100 Sears gift card/code for $100 or for $110. In this case, the reseller can make a profit by providing the payment for the gift card/code on a general purpose reloadable card/code run by the reseller. Then the reseller makes by interest, float, interchange, and/or monthly minimum fees. The reseller method described herein may also be provided as a tool by another entity that franchises or receives a fee for use of the tool.

Figure 4:
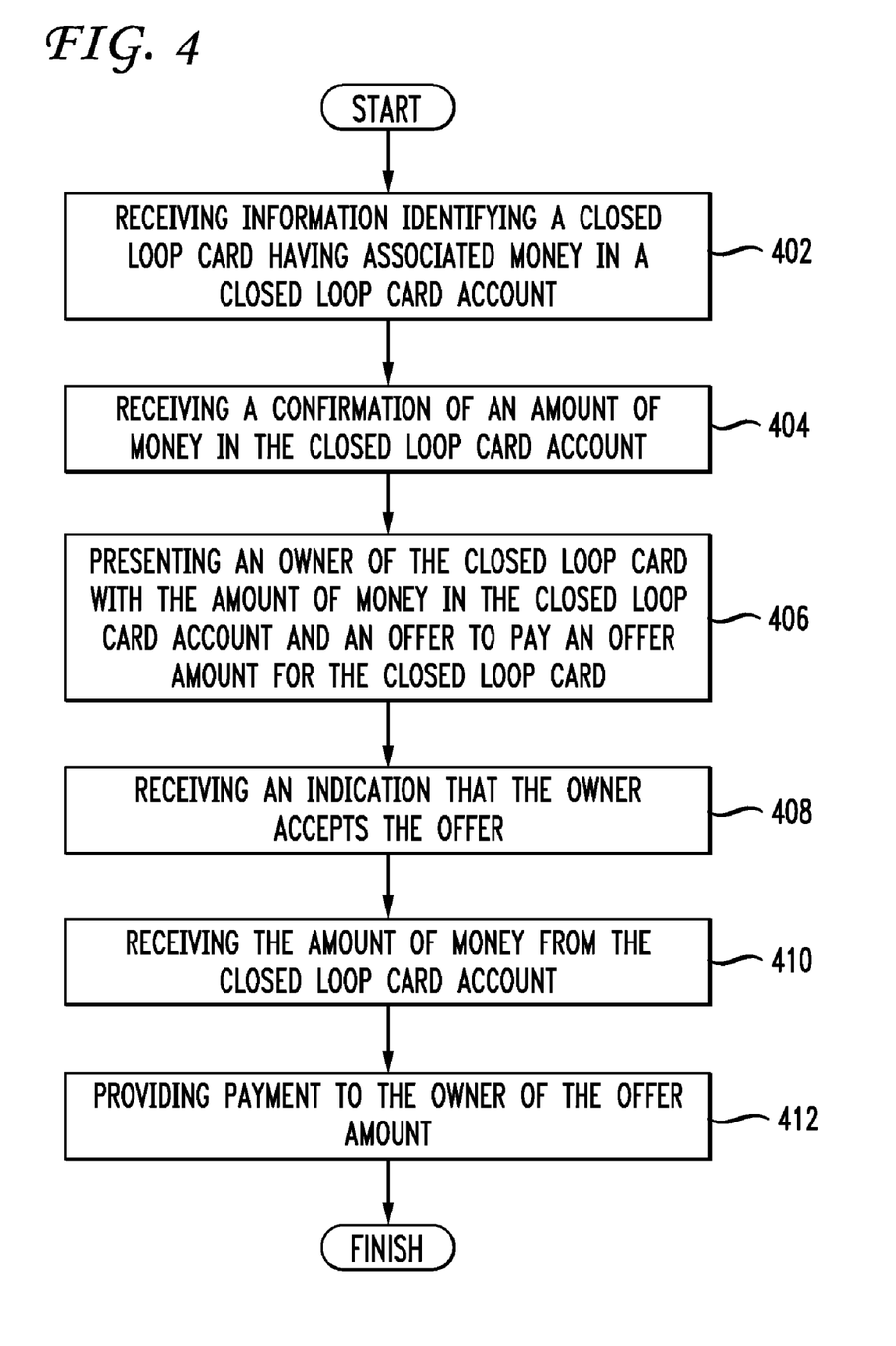
FIG. 4 illustrates an example method embodiment.

FIG. 4 illustrates an example method embodiment for processing closed loop cards/codes. The method can be practiced by a properly configured system 100 as shown in FIG. 1 or in a compute cluster or a server farm or other multi node configuration. The system first identifies a closed loop card/code having associated money in a closed loop card/code account (402). The card/code owner can swipe the closed loop card/code through a card/code reader to read information identifying the closed loop card/code. The card/code owner can also insert the card/code into a card/code reader within a kiosk in a manner similar to an Automated Teller Machine (ATM). In one aspect, a kiosk or other location which accepts and/or reads physical closed loop cards/codes can include a recycling receptacle for collecting used cards/codes. The collected used cards/codes can be recycled or destroyed. Certain closed loop card/code issuers may require this feature to keep deactivated or invalid cards/codes out of circulation. The system can restrict the amount of money the owner of the closed loop card/code can redeem over a period of time. The system can also restrict the number of cards/codes redeemed over a period of time. For example, the system can impose a $1,000 per month or 3 card/code per day limit. The system can require the card/code owner to create or log in to an account to redeem closed loop cards/codes. The system can also request that card/code owners enter driver's license information, social security number, credit card/code information, and/or any other information. This information can be used to direct payment to the owner and can also be used to check that the owner is not engaged in fraud with the closed loop card/code.

The system receives a confirmation of an amount of money in the closed loop card/code account (404). The system can interact with a multi-process secure gateway as shown in FIGS. 2 and 3 which communicates with one or more closed loop card/code processors to verify the closed loop card/code's validity and the amount in the closed loop card/code account. The system presents an owner of the closed loop card/code with the amount of money in the closed loop card/code account and an offer to pay an offer amount for the closed loop card/code (406). For example, the system can communicate to the user that the card/code account has $100 and offer to purchase the closed loop card/code for $50 in non-closed loop funds. The offer amount can be based on a resale velocity of cards/codes of a similar type as the closed loop card/code, inventory levels, and/or any other relevant business metrics.

In a "stub hub" or auction-based model, the offer to pay the offer amount is time-limited and/or conditional upon a resale of the closed loop card/code. The closed loop card/code is effectively offered up on consignment, meaning that the system provides payment to the owner of the offer amount upon resale to a third party. In this aspect, the system can deactivate or suspend the closed loop card/code after the owner accepts the offer and reactivate or reinstate the closed loop card/code after the time-limited offer expires without resale. The system can deactivate a card/code by simply withdrawing all the funds so that the card/code has a balance of $0.00. The system can notify the card/code owner when a sale occurs, when payment is sent, etc. The system can also notify the user that a time-limited consignment is expiring or expired. In this case, the system can present the user with the option to end the consignment, resume the consignment, accept a lower offer price to promote a speedier sale, etc. The owner can set the system to automatically renew the consignment for a number of time intervals or indefinitely.

The system receives an indication that the owner accepts the offer (408) and receives the amount of money from the closed loop card/code account (410). The system can, at this point, generate a new closed loop card/code associated with the amount of money. The system provides payment to the owner of the offer amount (412) in one or more of the payment methods set forth above. In one specific example, the system pays the owner by adding value to a new or existing open loop card/code. In another example, the system receives from the owner a set of smaller values totaling a sum equal to or lesser than the amount of money in the closed loop card/code account and divides the amount of money in the closed loop account into gift cards/codes in denominations of the set of smaller values. The system provides these gift cards/codes to the owner as payment. A concrete example of this scenario is a user who submits a $300 gift card/code to Best Buy, but does not want or need anything from Best Buy or does not live sufficiently close to a Best Buy. The user can sell the $300 gift card/code to the system for $175, and split that $175 into open or closed loop gift cards/codes in varying denominations. The user can request a $100 closed loop gift card/code to Target, a $50 open loop gift card/code, and a $25 closed loop gift card/code to Toys "Я" Us. The user can then regive these gift cards/codes to others. The user can request that the system deliver the gift cards/codes to a third party as a gift. For example, Abe sells a closed loop card/code for a gift card/code to Wal-Mart. Abe can request that the system send the gift card/code to Betty, his wife, as an anniversary present. Users can request that the system hold the gift card/code and deliver it on a specific day to a specific person. Users can further provide a personalized message for delivery with the gift card/code. In one aspect, the system provides users with a management interface to edit details of held gift cards/codes, such as cancelling the hold, delivering early, editing the personalized message, and other management functions.

The system can provide a mechanism for applying funds on an unwanted closed loop gift card/code toward payments of a bill (utility bill, car loan, student loan payment, cell phone bill, etc.). As an example, Tom presents a $50 Sears gift card/code to a Cash4Card site, which offers Tom $40 for the card/code. Tom elects to receive the $40 by way of entering the Third Party they wish to pay the funds to, and the Cash4Card site makes payment on Tom's behalf. The Cash4Card site can then prompt Tom to enter additional information, such as an account number, invoice number, or bill number.

In another variation, the owner had a $100 closed loop gift card/code and purchased merchandise with it such that $32.31 remained on the gift card/code. The system offers to purchase the $32.31 card/code for $19.39. The owner wants to use the offered purchase price as a gift card/code, but doesn't want to give a gift with a non-round number. The user can pay extra money in addition to the offered purchase price to obtain a gift card/code with the desired round number, such as an extra $0.61 to round up to $20 or an extra $5.61 to round up to $25.

In one aspect, the system offers for sale the new closed loop card/code at a second offer amount and, upon a user accepting the second offer for sale and upon receiving payment, generates and transfers the new closed loop card/code to the user. The user can request that the physical card/code be personalized based on input text, data, images, sounds, or other information.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    identifying a closed loop card associated with an amount of money in a closed loop card account;
    presenting an owner of the closed loop card with an offer to purchase the closed loop card for an offer amount;
    receiving from the owner an acceptance of the offer; and
    based on the acceptance:
        providing payment to the owner for the closed loop card;
        generating a new account;
        transferring funds from the closed loop card account to the new account;
        deactivating the closed loop card account; and
        offering the new account for resale as a gift code to a person other than the owner.

2. The method of claim 1, wherein the gift code can be used to pay a bill or debt, be converted to cash, be deposited via direct deposit into a bank account, and be used as merchant credit.

3. The method of claim 1, further comprising:
    receiving a set of smaller values totaling a sum equal to or lesser than the amount of money in the closed loop card account;
    dividing the amount of money in the closed loop account into denominations of the set of smaller values as a first gift code and a second gift code; and
    providing the first gift code and the second gift code to the owner as payment.

4. The method of claim 1, wherein information identifying the closed loop card is read from a physical closed loop card, the method further comprising receiving the physical closed loop card.

5. The method of claim 1, further comprising receiving a confirmation of the amount of money in the closed loop card account via a multi-process secure gateway which communicates with one or more closed loop card processors.

6. The method of claim 1, wherein the offer is time-limited and conditional upon a resale of the closed loop card, the method further comprising payment to the owner of the offer amount upon the resale.

7. The method of claim 6, further comprising:
deactivating the closed loop card after the owner accepts the offer; and
reactivating the closed loop card after a time-limit expires without resale.

8. The method of claim 1, wherein the offer amount is based on a resale velocity of cards of a similar type as the closed loop card.

9. The method of claim 1, further comprising restricting the amount of money the owner of the closed loop card can redeem over a period of time.

10. The method of claim 1, further comprising:
receiving an additional amount of money from the owner; and
wherein providing payment to the owner comprises providing the first gift code and the second gift code to the owner of the offer amount plus the additional amount of money.

11. The method of claim 1, wherein at least one of the first gift code and the second gift code is one of an open loop gift code and a closed loop gift code.

12. A system comprising:
a processor; and
a non-transitory computer-readable storage medium storing instructions which, when executed by the processor, control a processor to perform steps comprising:
identifying a closed loop card associated with an amount of money in a closed loop card account;
presenting an owner of the closed loop card with an offer to purchase the closed loop card for an offer amount;
receiving from the owner an acceptance of the offer; and
based on the acceptance:
providing payment to the owner for the closed loop card;
generating a new account;
transferring funds from the closed loop card account to the new account;
deactivating the closed loop card account; and
offering the new account for resale as a gift code to a person other than the owner.

13. The system of claim 12, wherein at least one of the first gift code and the second gift code is one of an open loop gift code and a closed loop gift code.

14. The method of claim 13, further comprising:
receiving a set of smaller values totaling a sum equal to or lesser than the amount of money in the account;
dividing the amount of money in the account into the first gift code and the second gift code in denominations of the set of smaller values; and
providing the first gift code and the second gift code to the owner as payment.

15. The method of claim 13, wherein each of the first gift code and the second gift code are one of an open loop gift code and a closed loop gift code.

16. A non-transitory computer-readable storage medium storing instructions which, when executed by a computing device, cause the computing device to perform steps comprising:
identifying a closed loop card associated with an amount of money in a closed loop card account;
presenting an owner of the closed loop card with an offer to purchase the closed loop card for an offer amount;
receiving from the owner an acceptance of the offer; and
based on the acceptance:
providing payment to the owner for the closed loop card;
generating a new account;
transferring funds from the closed loop card account to the new account;
deactivating the closed loop card account; and
offering the new account for resale as a gift code to a person other than the owner.

17. The non-transitory computer-readable storage medium of claim 16, wherein the offer is time-limited and conditional upon a resale of the closed loop card, the instructions further comprising providing payment to the owner of the offer amount upon the resale.

18. The non-transitory computer-readable storage medium of claim 17, the instructions, when executed by the computing device, further cause the computing device to perform steps comprising:
deactivating the closed loop card after the owner accepts the offer; and
reactivating the closed loop card after a time-limit expires without resale.

19. The non-transitory computer-readable storage medium of claim 16, wherein the offer amount is based on a resale velocity of cards of a same type as the closed loop card.

20. The non-transitory computer-readable storage medium of claim 16, wherein at least one of the first gift code and the second gift code is one of an open loop gift code and a closed loop gift code.

21. A method comprising:
identifying a first code associated with an amount of money in an account, wherein the first code is electronic and independent of a physical gift instrument;
presenting an owner of the first code with an offer to purchase the first code for an offer amount;
receiving from the owner an acceptance of the offer; and
based on the acceptance:
providing payment to the owner for the first code;
generating a new account;
transferring funds from the account to the new account;
deactivating the account; and
offering the new account for resale as a gift code to a person other than the owner.

22. The method of claim 21, wherein the first gift code and the second gift code can be used to: pay a bill or debt, be converted to cash, be deposited via direct deposit into a bank account, and be used as merchant credit.

* * * * *

UNITED STATES PATENT AND TRADEMARK OFFICE
CERTIFICATE OF CORRECTION

PATENT NO. : 8,152,061 B2
APPLICATION NO. : 12/702600
DATED : April 10, 2012
INVENTOR(S) : Jason Wolfe et al.

It is certified that error appears in the above-identified patent and that said Letters Patent is hereby corrected as shown below:

In the Claims

At column 11, claim 11, line 26, change "1," to --3,--.

At column 11, claim 13, line 48, change "at least one of the first" to --the--.

At column 11, claim 13, line 49, delete "and the second gift code".

At column 11, claim 14, line 54, change "the first" to --a first--.

At column 11, claim 14, line 55, change "the second" to --a second--.

At column 12, claim 15, line 1, change "13," to --14,--.

At column 12, claim 20, line 37, change "at least one of the first gift code and the" to --the gift code--.

At column 12, claim 20, line 38, delete "second gift code".

At column 12, claim 22, line 54, change "first gift code and" to --gift code--.

At column 12, claim 22, line 55, delete "the second gift code".

Signed and Sealed this
Twenty-first Day of May, 2013

Teresa Stanek Rea
*Acting Director of the United States Patent and Trademark Office*